United States Patent
Müller et al.

(10) Patent No.: US 8,348,345 B2
(45) Date of Patent: Jan. 8, 2013

(54) FITTING SYSTEM FOR A VEHICLE SEAT (75) Inventors: Peter Müller, Mackenbach (DE); Stefan Haber, Pirmasens (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 377 days.

(21) Appl. No.: 12/624,738

(22) Filed: Nov. 24, 2009

(65) Prior Publication Data

US 2010/0127547 A1    May 27, 2010

(30) Foreign Application Priority Data

Nov. 25, 2008   (DE) .......................... 10 2008 059 355

(51) Int. Cl.
*B60N 2/20*    (2006.01)

(52) U.S. Cl. .................... 297/366; 297/368; 297/378.12

(58) Field of Classification Search .......... 297/366–376, 297/378.12

See application file for complete search history.

(56) References Cited

U.S. PATENT DOCUMENTS

| 6,860,560 B2 * | 3/2005 | Chiu et al. ................ 297/367 R |
| 6,908,156 B1 * | 6/2005 | Park et al. ..................... 297/366 |
| 2002/0043853 A1 * | 4/2002 | Shephard ...................... 297/367 |

FOREIGN PATENT DOCUMENTS

| DE | 297 23 876 U1 | 7/1999 |
| DE | 199 15 780 C1 | 1/2001 |

* cited by examiner

*Primary Examiner* — Peter Brown
*Assistant Examiner* — Erika Garrett
(74) *Attorney, Agent, or Firm* — McGlew and Tuttle, P.C.

(57) ABSTRACT

A fitting system (9) is provided for a vehicle seat (1), especially motor vehicle seat, which defines a pivot axis (A) of backrest and has a fitting lower part (11) and an associated fitting upper part (12) on both sides of the vehicle seat. Each fitting upper part (12) is pivotable relative to the associated fitting lower part (11) about the pivot axis (A) of the backrest. The system has, on one side of the vehicle seat, a lock (15) and an opposing element (16), which lock the fitting system (9) in a use position by cooperating. A prestressed latch (17), which cooperates with another opposing element (16), especially receives it, in the use position, is provided on the side of the vehicle seat that is located opposite the lock (15).

19 Claims, 8 Drawing Sheets

Fig.7

FITTING SYSTEM FOR A VEHICLE SEAT

CROSS REFERENCE TO RELATED APPLICATIONS

This application claims the benefit of priority under 35 U.S.C. §119 of German Patent Application DE 10 2008 059 355.9 filed Nov. 25, 2008, the entire contents of which are incorporated herein by reference.

FIELD OF THE INVENTION

The present invention pertains to a fitting system for a vehicle seat, especially a motor vehicle seat, which defines a pivot axis of the backrest and has both a fitting lower part and an associated fitting upper part on the two sides of the vehicle seat.

BACKGROUND OF THE INVENTION

It is known in vehicle seats in rear rows of seats that a backrest is mounted pivotably on the vehicle body by means of a simple fitting system and is locked with the vehicle body by means of a lock contained in the fitting system. A fitting system of the type mentioned in the introduction is known by use, in which a lock is provided on only one side of the vehicle seat, for example, on the lower part of the fitting, which is then locked on the opposing element, for example, a bolt (or a strap) on the upper part of the fitting.

SUMMARY OF THE INVENTION

The basic object of the present invention is to provide an alternative to the fitting system of the type mentioned in the introduction.

According to the invention, a fitting system is provided for a vehicle seat, the system defining a pivot axis of a backrest. The system comprises a fitting lower part on each of two sides of the vehicle seat and an associated fitting upper part on the two sides of the vehicle seat. Each fitting upper part is pivotable about the pivot axis of the backrest relative to the associated fitting lower part. The fitting upper part on one side of the vehicle seat has a lock cooperating with an opposing element to lock the fitting system in a use position. A prestressed latch cooperates with another opposing element and receives same on the other side of the vehicle seat located opposite the lock.

With a latch on the side of the vehicle seat located opposite the lock, cost-effective securing of this side of the vehicle seat is brought about for the case of a crash. The prestressing of the latch prevents noise from being generated and compensates tolerances. By the latch receiving the opposing element associated with it such that the opposing element is movable over an idle path relative to the latch, the upper part of the fitting can move, with the lock unlocked, into a position in which the latch opens based on its motion alone (i.e., the pivoting motion of the backrest). Thus, no additional actuating forces and no additional actuating elements are to be provided. By contrast, the latch will act, with the lock locked, in case of a crash such that it prevents a further motion of the upper part of the fitting. Energy can be dissipated by a specific torsion of the backrest. The fitting system can thus be used both in case of locking with the floor and in case of locking with, for example, the C pillar.

To open the latch, for example, a shaft is provided, which transmits the relative motion between the lock and the opposing element thereof, polled, for example, by a carrier lever, to the other side of the vehicle seat, where a torque overcoming the prestress is exerted on the latch, for example, by means of a plate cam. The latch can be kept open, for example, by the plate cam, which is prestressed and/or is provided with a suitable contour. It is advantageous to generate the prestress of the latch by a spring between the latch and the plate cam. The characteristic of the spring can be selected such that it is adapted to the application, for example, by selecting a buckling spring.

The present invention will be explained in more detail below on the basis of two exemplary embodiments shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, a vehicle seat 1, which is provided here in a back seat unit of a motor vehicle, has a seat part 3 and a backrest 4. The arrangement of vehicle seat 1 within the motor vehicle and the usual direction of travel of the vehicle define the directional data used below. Seat part 3 is rigidly—or optionally longitudinally displaceably—connected to the vehicle body S, while backrest 4 is pivotable relative to vehicle body S, in this case in the forward direction from at least one use position inclined for the use of the seat into an out-of-use position (and back). Backrest 4 is articulated for this by means of the fitting system 9 to the vehicle body S (or to the seat part 3) and can be locked with this.

The fitting system 9 has, on both sides of the vehicle seat, a fitting lower part 11 each and a fitting upper part 12 each, which is pivotable by means of a backrest hinge 14 relative to the associated fitting lower part 11. The two metal fitting lower parts 11 are fastened to the vehicle body S (or to seat part 3), i.e., they are rigidly connected to the vehicle body, whereas the two metal fitting upper parts 12 are fastened to backrest 4, i.e., they are rigidly connected to the backrest. The two backrest hinges 14 are aligned with one another and thereby define the pivot axis A of the backrest.

A lock 15 is fastened to the fitting lower part 11 on one side of the vehicle seat, here the side located farther on the outside (rocker panel side). The opposing element 16, with which lock 15 cooperates for locking, is designed as a bolt and projects from the fitting upper part 12, doing so in parallel to the pivot axis A of the backrest and below same. Such an arrangement comprising the fitting lower part 11, fitting upper part 12, backrest hinge 14, lock 15 and opposing element 16, is also called a folding fitting.

Another opposing element 16, which cooperates with a latch 17, which is mounted pivotably on the fitting lower part 11 by means of a bearing bolt 19, is provided in the same manner on the other side of the vehicle seat, i.e., on the side located farther on the inside (tunnel side), on the fitting upper part 12 located there. Opposing element 16 is received by latch 17 with an idle path L (or at least with a clearance), i.e., opposing element 16 is movable over the idle path L relative to latch 17.

Figure 1A:
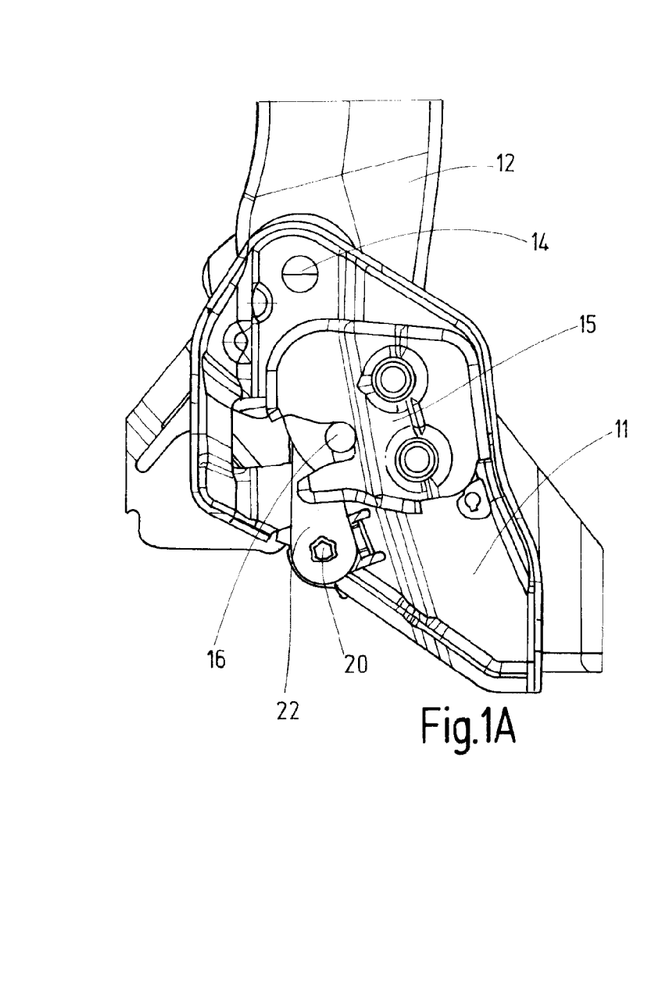
FIG. 1A is a right side view of the fitting system in the position of use.
Figure 1B:
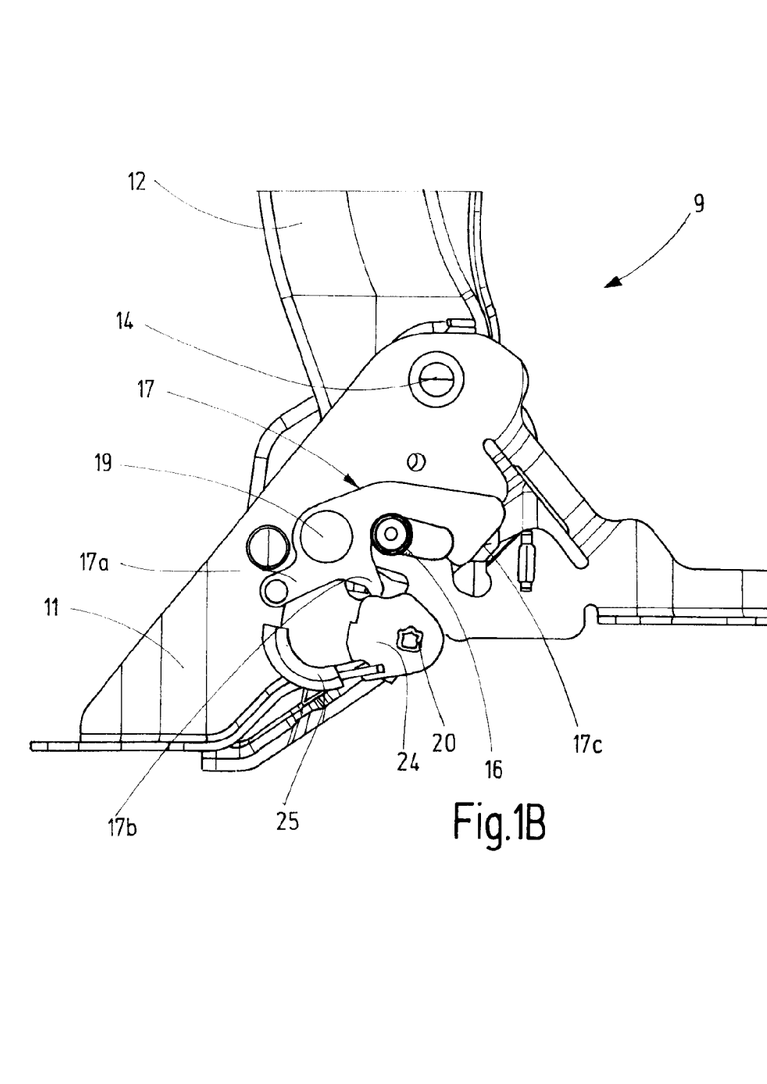
FIG. 1B is a left side view of the first exemplary embodiment in the position of use.
Figure 7:
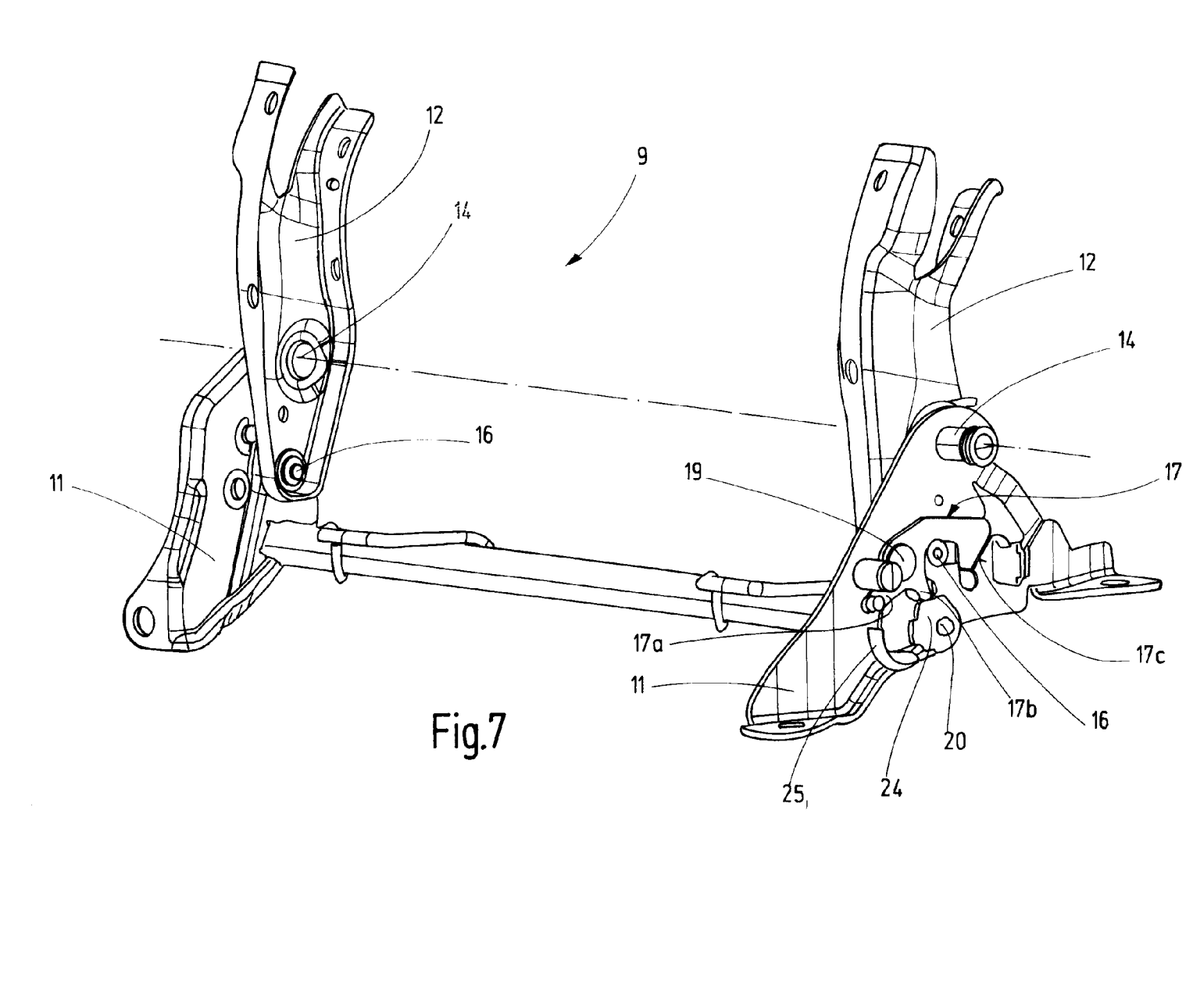
FIG. 7 is a perspective front view of the fitting system.

A shaft 20 is mounted rotatably on the two fitting lower parts 11. A carrier lever 22 is connected to shaft 20 such that they rotate in unison on the side of the vehicle seat on which lock 15 is located. Carrier lever 22 is seated here on the profiled shaft 20 in a positive-locking manner. Carrier lever 22 is preferably in contact with opposing element 16. A plate cam 24 is connected to shaft 20 such that they rotate in unison on the side of the vehicle seat on which latch 17 is located. Plate cam 24 is seated here on the profiled shaft 20 in a positive-locking manner. A buckling spring 25 is arranged between latch 17 and plate cam 24, so that a closing torque acts, in the clockwise direction in the drawing, on latch 17 at a closing arm 17a made integrally in one piece, whereas a control pin 17b made integrally in one piece with latch 17 and plate cam 24 press each other. The lever arms are selected to be such that the closing torque at control pin 17b is greater in the use position (FIG. 1A, FIG. 1B, FIG. 7) than the opening torque of plate cam 24.

When vehicle seat 1 is in its locked use position and a crash occurs, crash torques, which seek to pivot backrest 4, act on backrest 4. Lock 15 now fixes backrest 4 on one side of the vehicle seat, whereas the opposing element 16 can move within the idle path L relative to latch 17 on the other side of the vehicle seat. This leads to torsion of backrest 4, whereby energy can be dissipated. The size of the idle path L is therefore selected in agreement with the special application of the fitting system 9. The idle path L corresponds here to a pivoting motion of the fitting upper part 12 by 14°.

Figure 2A:
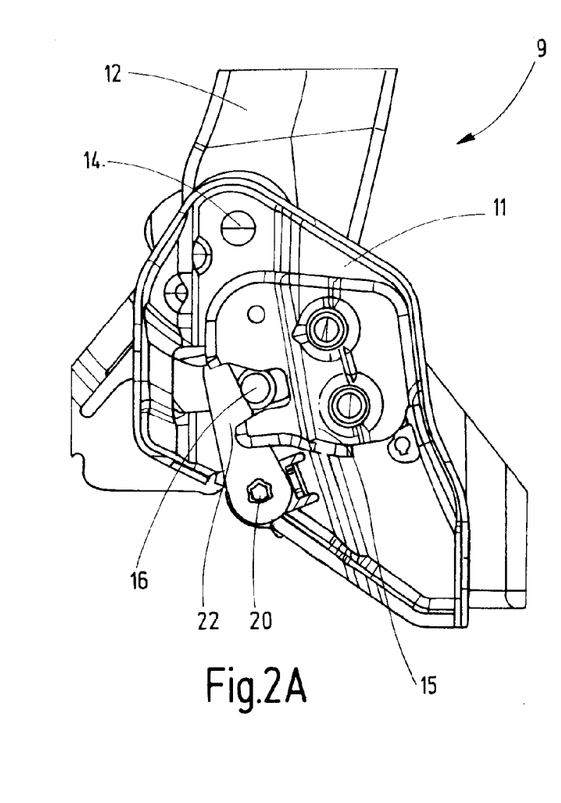
FIG. 2A is a right side view of the fitting system with the lock unlocked.
Figure 2B:
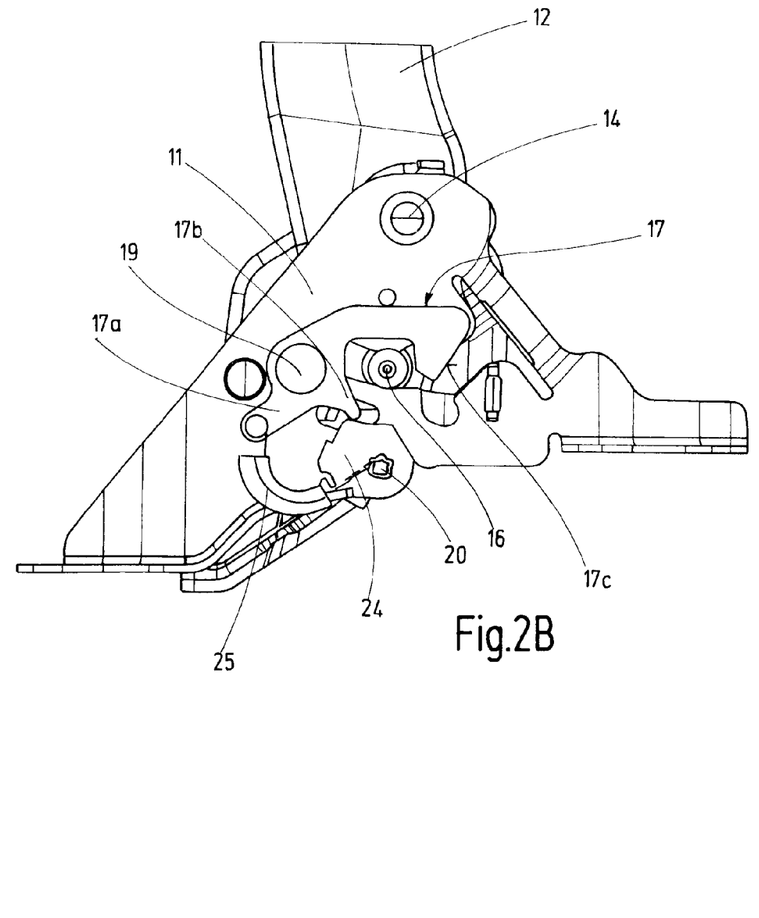
FIG. 2B is a left side view of the first exemplary embodiment with the lock unlocked.
Figure 3A:
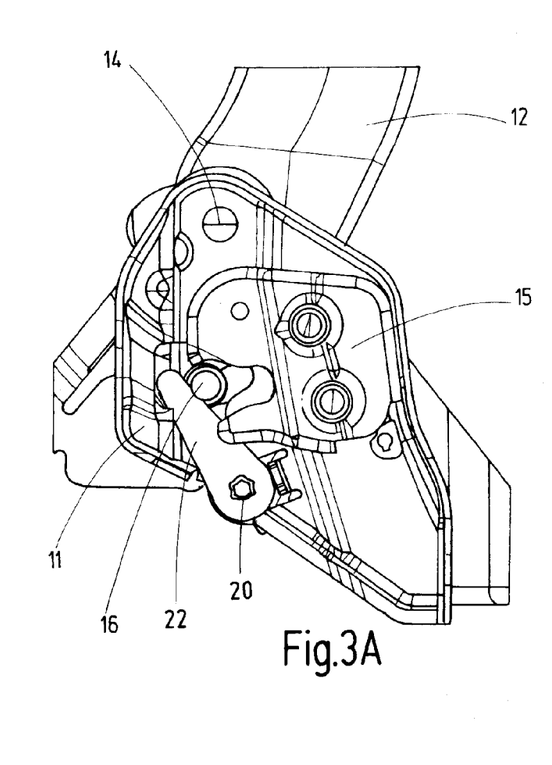
FIG. 3A is a right side view of the fitting system during the opening of the latch.
Figure 3B:
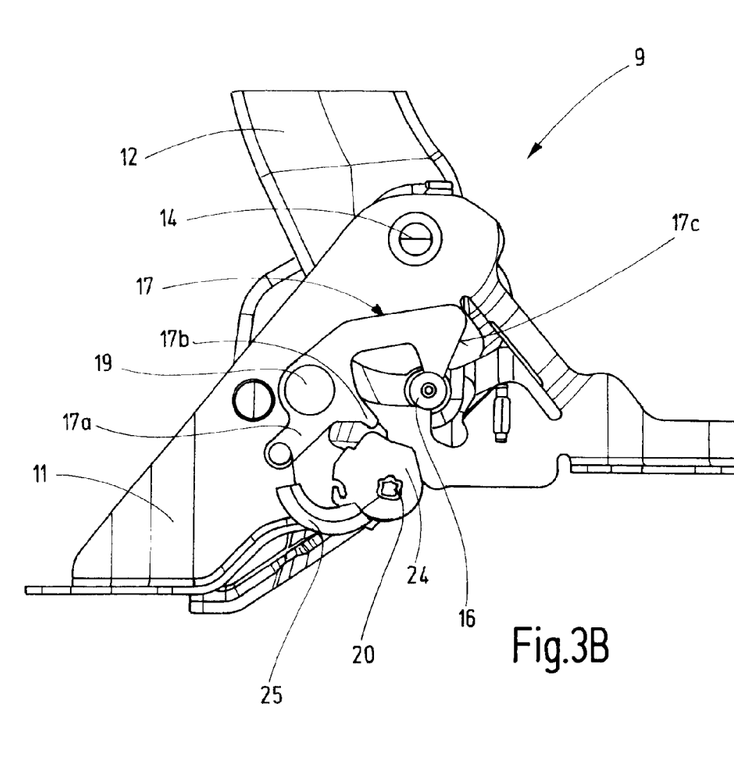
FIG. 3B is a left side view of the first exemplary embodiment during the opening of the latch.
Figure 4A:
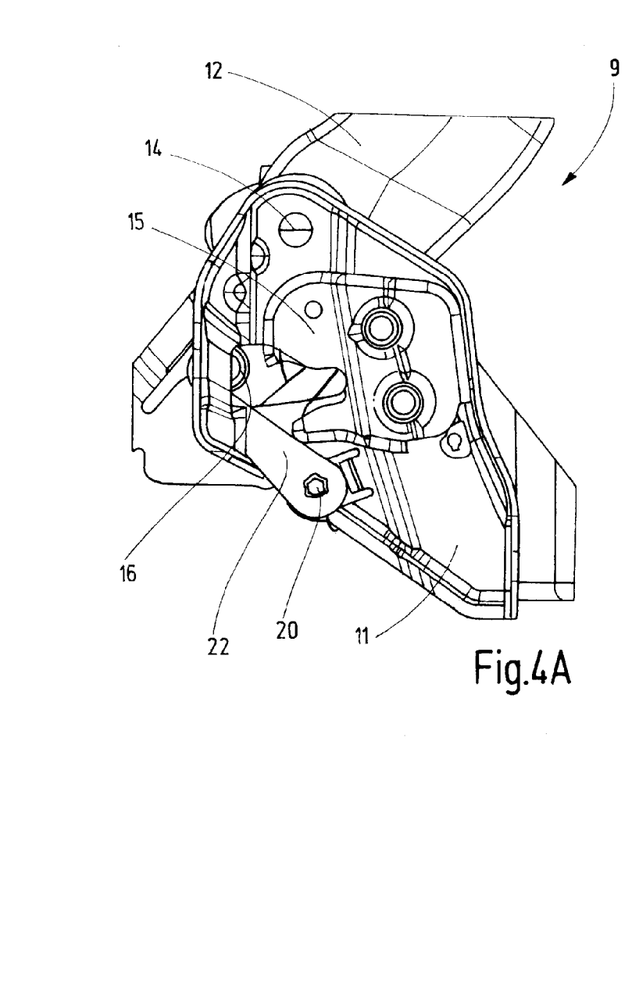
FIG. 4A is a right side view of the fitting system in the out-of-use position.
Figure 4B:
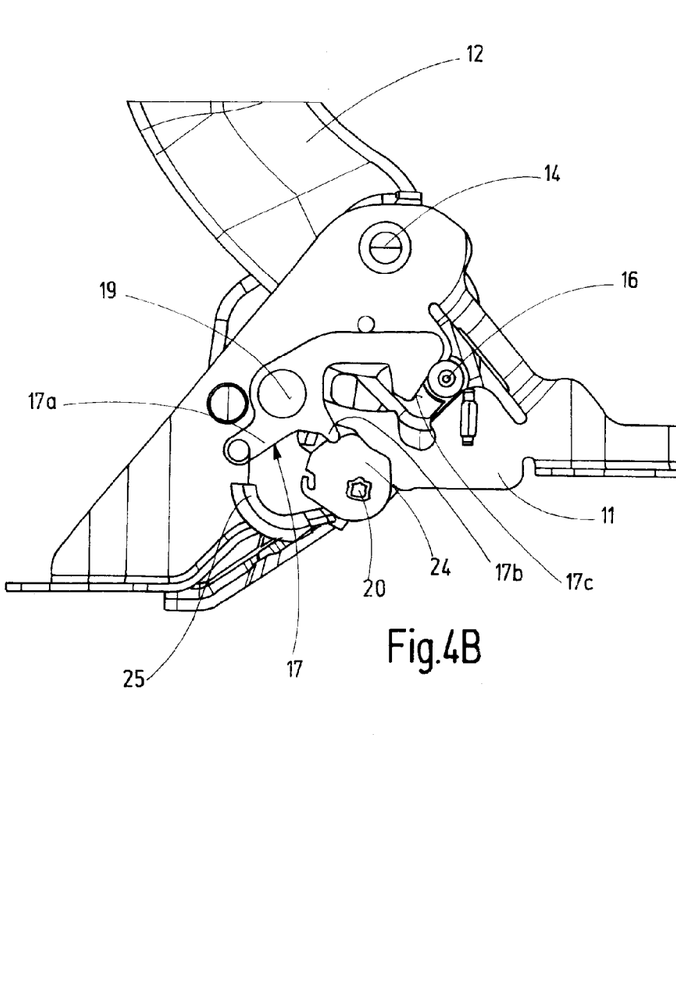
FIG. 4B is a left side view of the first exemplary embodiment in the out-of-use position.
Figures 5, 6:
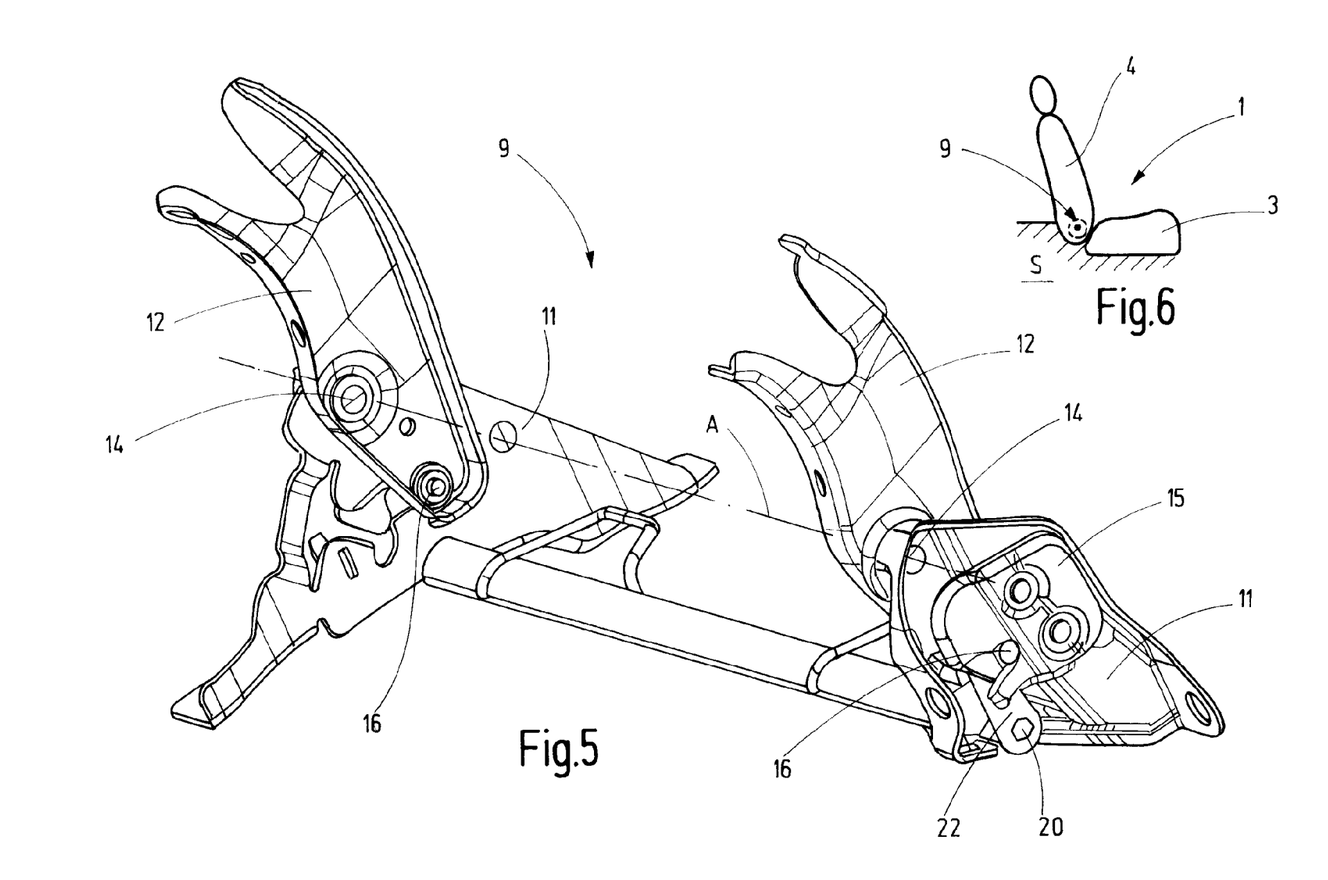
FIG. 5 is a perspective rear view of the fitting system.
FIG. 6 is a schematic side view of a vehicle seat.
Figure 8:
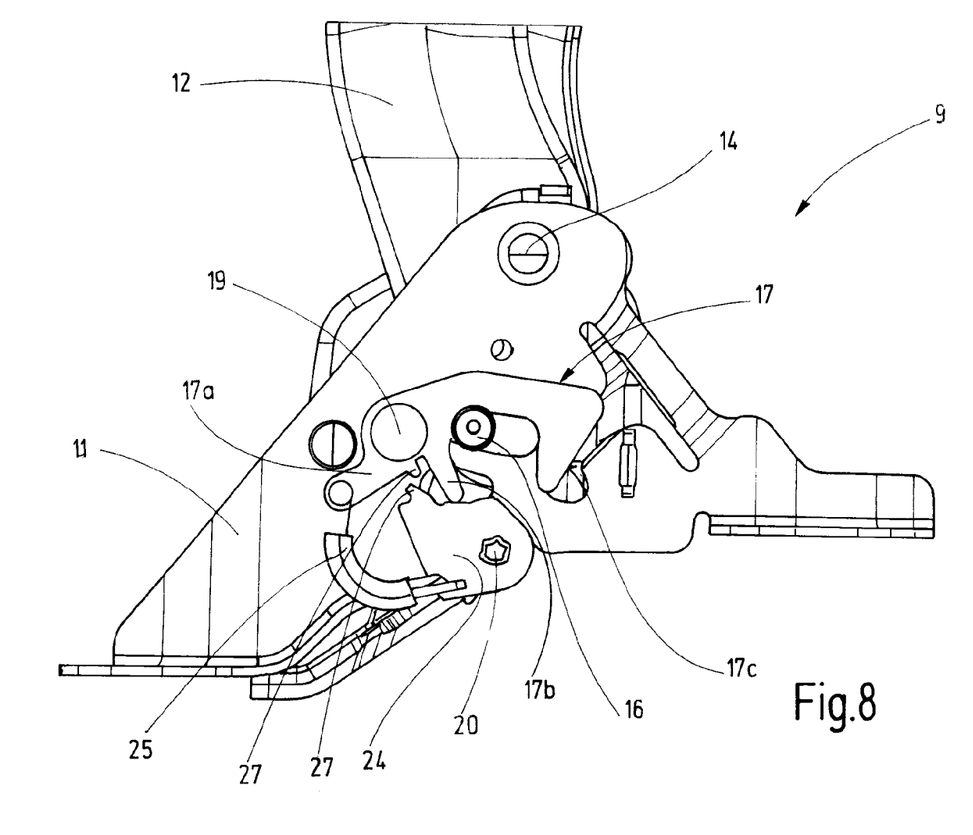
FIG. 8 is a left side view of the second exemplary embodiment in the position of use.
Figure 9:
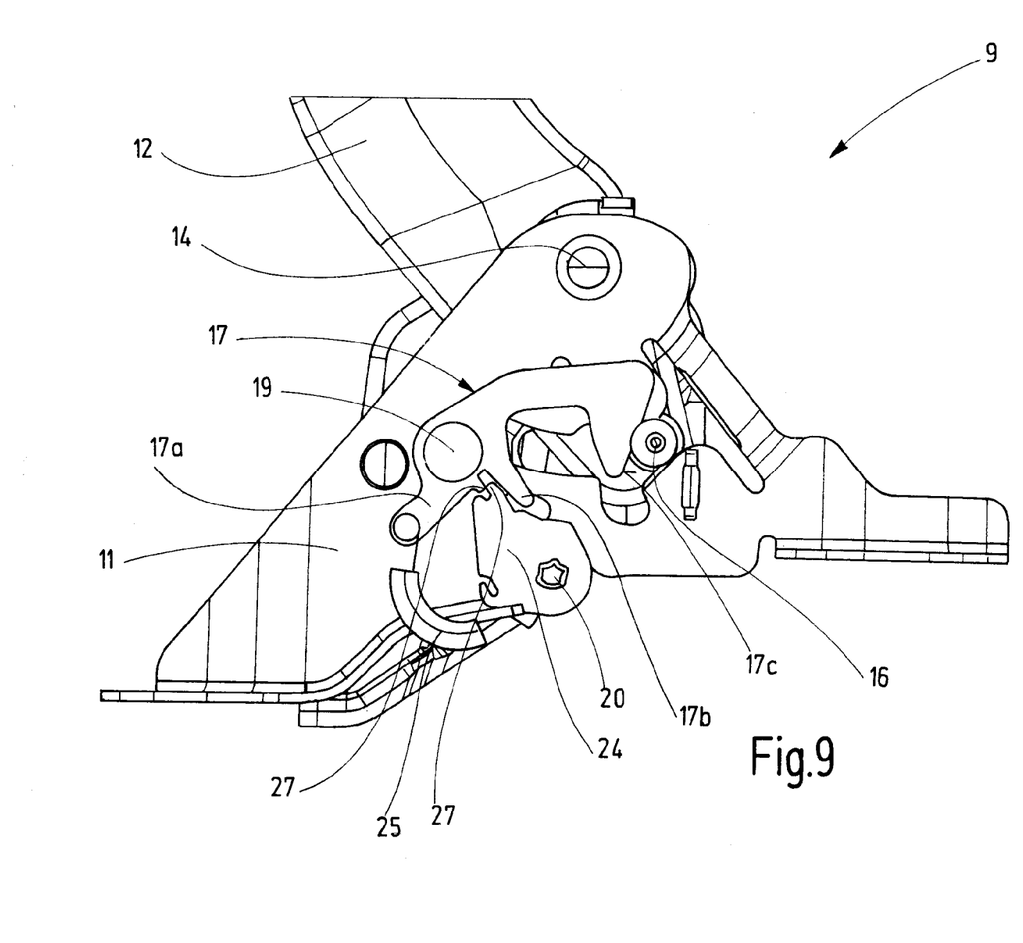
FIG. 9 is a left side view of the second exemplary embodiment in the out-of-use position.

Lock 15 is unlocked, preferably by means of a cable from the upper end of backrest 4, during the transition from the locked use position (FIG. 1A, FIG. 1B, FIG. 7) into the out-of-use position (with backrest 4 pivoted forward). The unlocked lock 15 releases the associated opposing element 16 and hence backrest 4. Backrest 4 can now be pivoted forward at the fitting upper parts 12, as a result of which the two opposing elements 16 are pivoted backward. Carrier lever 22 is pressed backward by the pivoting opposing element 16 on the side of the vehicle seat on which lock 15 is located (FIG. 2A, FIG. 3A), as a result of which shaft 20 rotates. On the side of the vehicle seat that is located opposite the lock 15, plate cam 24 presses the control pin 17b and opens hereby the latch 17 against the prestress of buckling spring 25 (FIG. 2B). The released opposing element 16 can likewise pivot backward as a result, and latch 17 may open wider, possibly because of a changing contact angle (FIG. 3B). Plate cam 24 keeps latch 17 open (FIG. 4B, FIG. 8).

The two exemplary embodiments are identical up to this point, especially also in the embodiment of the side of the vehicle seat on which lock is located (FIG. 1A, FIG. 2A, FIG. 3A, FIG. 4A). There are differences in how latch 17 is kept open. As in the use position, the closing torque at the control pin 17b is greater than the opening torque of plate cam 24 in the first exemplary embodiment (FIG. 1B, FIG. 2B, FIG. 3B, FIG. 4B). Latch 17 and plate cam 24 mutually lock in the second exemplary embodiment (FIGS. 7 and 8), for which a catch 27 each is provided on both components.

The steps will take place in the reverse order during the return from the out-of-use position into the use position. Opposing element 16 comes into contact with a bevel 17c of latch 17 on the side of the vehicle seat on which latch 17 is located, as result the latch 17 will open. Plate cam 24 follows the opening latch 17. As soon as the opposing element 16 is received by latch 17, buckling spring 25 will again close latch 17, and plate cam 24 will be pivoted into its starting position. At the same time, the opposing element 16 located on the side of the vehicle seat on which lock 15 is located is received by lock 15, as a result of which backrest 4 is again locked.

While specific embodiments of the invention have been described in detail to illustrate the application of the principles of the invention, it will be understood that the invention may be embodied otherwise without departing from such principles.

APPENDIX

List of Reference Numbers/Symbols

1 Vehicle seat
3 Seat part
4 Backrest
9 fitting system
11 fitting lower part
12 fitting upper part
14 Backrest hinge
15 Lock
16 Opposing element
17 Latch
17a Closing arm
17b Control pin
17c Bevel
19 Bearing bolt
20 Shaft
22 Carrier lever
24 Plate cam
25 Buckling spring
27 Catch
A Pivot axis of backrest
L Idle path
S Vehicle body

What is claimed is:
1. A fitting system for a vehicle seat, the system defining a pivot axis of a backrest, the system comprising:
   a fitting lower part on each of two sides of the vehicle seat;
   a fitting upper part on the two sides of the vehicle seat, wherein each fitting upper part is pivotable about the pivot axis of the backrest relative to the associated fitting lower part;
   a lock, said fitting upper part on one side of the vehicle seat having said lock cooperating with an opposing element to lock the fitting system in a use position; and a prestressed latch cooperating with another opposing element and receiving same on the other side of the vehicle seat located opposite the lock, wherein said another opposing element received by said latch is movable over an idle path relative to said latch including when said lock is locked with the fitting system in the use position.

2. A fitting system in accordance with claim 1, wherein said lock and said latch are provided on the fitting lower parts and the opposing elements are provided on the fitting upper parts.

3. A fitting system in accordance with claim 1, further comprising:
   a shaft mounted rotatably at the two fitting lower parts or at the two fitting upper parts.

4. A fitting system in accordance with claim 3, further comprising:
   a plate cam connected to said shaft for rotation in unison therewith, said plate cam being arranged on a side of the vehicle seat on which said latch is located.

5. A fitting system in accordance with claim 4, wherein:
   said latch has a control pin; and
   said plate cam is in contact with said latch at said control pin of said latch.

6. A fitting system in accordance with claim 5, wherein said shaft rotates said plate cam which opens said latch to release said opposing element of said lock.

7. A fitting system in accordance with claim 6, wherein:
   said plate cam has one or more catches; and
   said plate cam keeps said latch open with said catches.

8. A fitting system in accordance with claim 4, wherein:
   said latch has a closing arm;
   a prestressed buckling spring exerts a closing torque on said latch and is arranged between a closing arm of said latch and said plate cam.

9. A fitting system in accordance with claim 3, further comprising: a carrier lever is connected to said shaft for rotation in unison therewith, wherein:
   said carrier lever is in contact with said opposing element of said lock and said carrier lever is arranged on a side of said vehicle seat on which said lock is located.

10. A fitting system in accordance with claim 9, wherein for passing over from the use position into an out-of-use position, said lock is unlocked and said fitting upper parts pivot relative to said fitting lower parts.

11. A fitting system in accordance with claim 9, wherein said pivoting fitting upper part on a side of the vehicle seat on which said lock is located pivots said carrier lever by said opposing element to rotate said shaft.

12. A motor vehicle seat comprising a backrest and a fitting system for pivoting said backrest relative to a vehicle body about a backrest pivot axis and for locking the backrest relative to the vehicle body, the fitting system comprising:
   a first side fitting lower part;
   a first side fitting upper part, said first side fitting upper part being pivotable about the backrest pivot axis relative to said first side fitting lower part;
   a second side fitting lower part;
   a second side fitting upper part, said second side fitting upper part being pivotable about the backrest pivot axis relative to said second side fitting lower part;
   a lock associated with said first side and cooperating with an opposing element to lock said fitting system in a use position; and
   a prestressed latch associated with said second side for receiving another opposing element, wherein said another opposing element received by said latch is movable over an idle path relative to said latch including when said lock is locked with the fitting system in said use position.

13. A motor vehicle seat in accordance with claim 12, wherein said lock and said latch are provided on the fitting lower parts and the opposing elements are provided on the fitting upper parts.

14. A motor vehicle seat in accordance with claim 12, further comprising:
   a shaft mounted rotatably at the two fitting lower parts or at the two fitting upper parts; and
   a plate cam connected to said shaft for rotation in unison therewith, said plate cam being arranged on a side of the vehicle seat on which said latch is located.

15. A motor vehicle seat in accordance with claim 14, wherein:
   said latch has a control pin; and
   said plate cam is in contact with said latch at said control pin of said latch.

16. A motor vehicle seat in accordance with claim 14, wherein:
   said latch has a closing arm;
   a prestressed buckling spring exerts a closing torque on said latch and is arranged between a closing arm of said latch and said plate cam.

17. A motor vehicle seat in accordance with claim 14, further comprising: a carrier lever is connected to said shaft for rotation in unison therewith, wherein:
   said carrier lever is in contact with said opposing element of said lock and said carrier lever is arranged on a side of said vehicle seat on which said lock is located.

18. A motor vehicle seat in accordance with claim 17, wherein:
   for passing over from the use position into an out-of-use position, said lock is unlocked and said fitting upper parts pivot relative to said fitting lower parts;
   said first pivoting fitting upper part pivots said carrier lever by said opposing element to rotate said shaft.

19. A motor vehicle seat comprising a backrest and a fitting system for pivoting said backrest relative to a vehicle body about a backrest pivot axis and for locking the backrest relative to the vehicle body, the fitting system comprising:
   a first side fitting lower part;
   a first side fitting upper part, said first side fitting upper part being pivotable about the backrest pivot axis relative to said first side fitting lower part;
   a second side fitting lower part;
   a second side fitting upper part, said second side fitting upper part being pivotable about the backrest pivot axis relative to said second side fitting lower part;
   a lock associated with said first side and cooperating with an opposing element to lock said fitting system in a use position;
   a prestressed latch associated with said second side for receiving another opposing element;
   a shaft mounted rotatably at the two fitting lower parts or at the two fitting upper parts;
   a plate cam connected to said shaft for rotation in unison therewith, said plate cam being arranged on a side of the vehicle seat on which said latch is located, said latch having a control pin, said plate cam being in contact with said latch at said control pin of said latch.

* * * * *